(No Model.) 7 Sheets—Sheet 2.

W. N. PARKES.
SEWING MACHINE.

No. 592,510. Patented Oct. 26, 1897.

WITNESSES:

INVENTOR
William N. Parkes
BY
ATTORNEY

(No Model.)  7 Sheets—Sheet 3.

W. N. PARKES.
SEWING MACHINE.

No. 592,510. Patented Oct. 26, 1897.

WITNESSES:
G. W. Eisenbraun
Eugenie A. Persides.

INVENTOR
William N. Parkes,
BY
A. Faber du Faur
ATTORNEY (No Model.) 7 Sheets—Sheet 4.

W. N. PARKES.
SEWING MACHINE.

No. 592,510. Patented Oct. 26, 1897.

WITNESSES:
G. W. Eisenbraun
Eugenie A. Persides.

INVENTOR
William N. Parkes,
BY
A. Faber du Faur
ATTORNEY (No Model.) 7 Sheets—Sheet 6.

W. N. PARKES.
SEWING MACHINE.

No. 592,510. Patented Oct. 26, 1897.

WITNESSES:
William S. Donnelly.
GW A Eisenbraun

INVENTOR
William N. Parkes
BY
A Faber du Faur J.
ATTORNEY

UNITED STATES PATENT OFFICE.

WILLIAM N. PARKES, OF BROOKLYN, NEW YORK.

SEWING-MACHINE.

SPECIFICATION forming part of Letters Patent No. 592,510, dated October 26, 1897.

Application filed February 20, 1896. Serial No. 579,995. (No model.)

*To all whom it may concern:*

Be it known that I, WILLIAM N. PARKES, a citizen of the United States of America, and a resident of Brooklyn, in the county of Kings and State of New York, have invented certain new and useful Improvements in Sewing-Machines, of which the following is a specification.

My invention has reference to improvements in sewing-machines, and especially to the so-called "zigzag, overseaming, or serge sewing-machines," it having for its object to expand the mechanism of such machines to automatically form buttonholes, tacks, bars, and an unlimited variety of stitches or stitch designs.

The essential feature of my invention consists in combining with the stitch-forming mechanism of a sewing-machine having a vertically-reciprocating and laterally-vibrating needle bar or holder means for automatically changing laterally the working position of vibration of the needle-bar or needle-holder—in other words, shifting laterally the working position of the vibratory action thereof with or without changing the amount of said action.

My invention also consists in means for automatically increasing, decreasing, reversing, or arresting the action of the feed on ordinary reversible underfeed machines.

The nature of my invention will best be understood when described in connection with the accompanying drawings, in which—

Fig. 12 is a front view illustrating a mechanism for driving a cam-shaft, differing in several respects from that shown in Figs. 1 to 4. Fig. 15 is a section on the line 15 15, Fig. 14, drawn on an enlarged scale. Figs. 16 to 26 are detail views, on the same scale as Fig. 15, of the several parts shown in said figure.

Similar letters and numerals of reference designate corresponding parts throughout the several views of the drawings.

Referring to the drawings, the letter A designates the head of the sewing-machine; B, the hand-wheel; C, the main shaft; D, the needle-bar, and E the segment-lever, from which the needle-bar is laterally vibrated. In the usual zigzag machines the needle-bar is guided in a pivoted gate or frame F, and to said gate or frame a vibratory motion is imparted from the segment-lever E by a link connection. The extent of the throw of the stitch is changed by shifting the end of the link in the seat of the segment-lever E. By this mechanism a lateral throw in opposite directions is imparted to the needle-bar, which throw, in connection with the feed, then forms a zigzag stitch.

Figure 1:
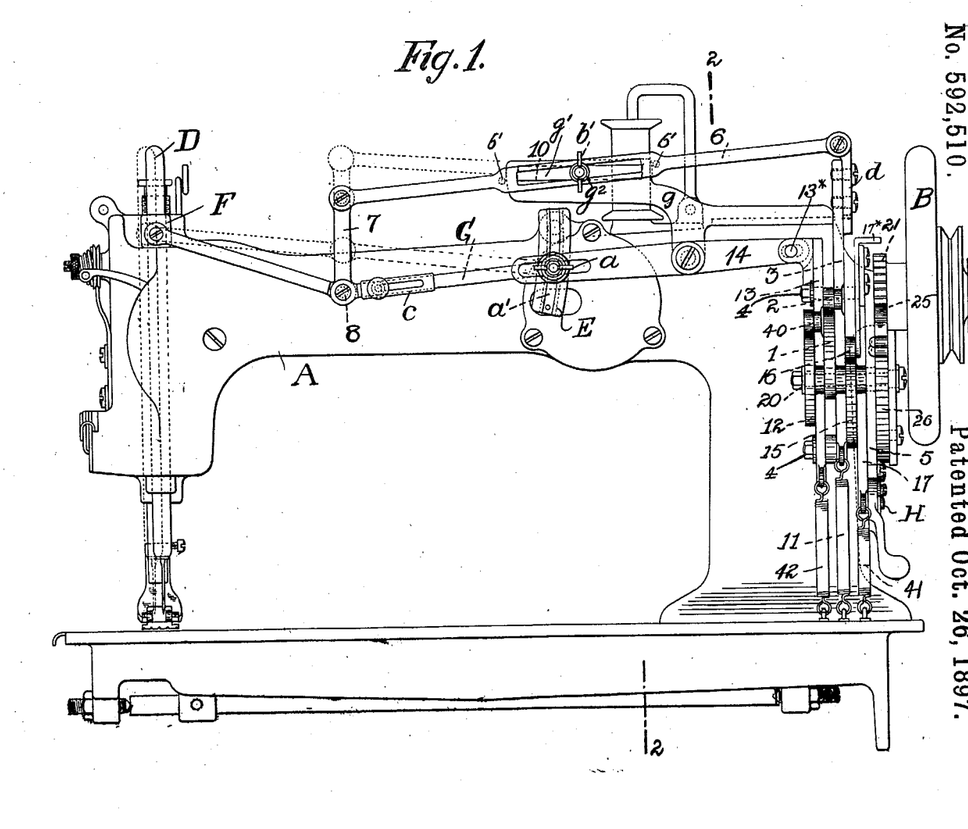
Figure 1 represents a front elevation of a sewing-machine embodying my invention.
Figure 2:
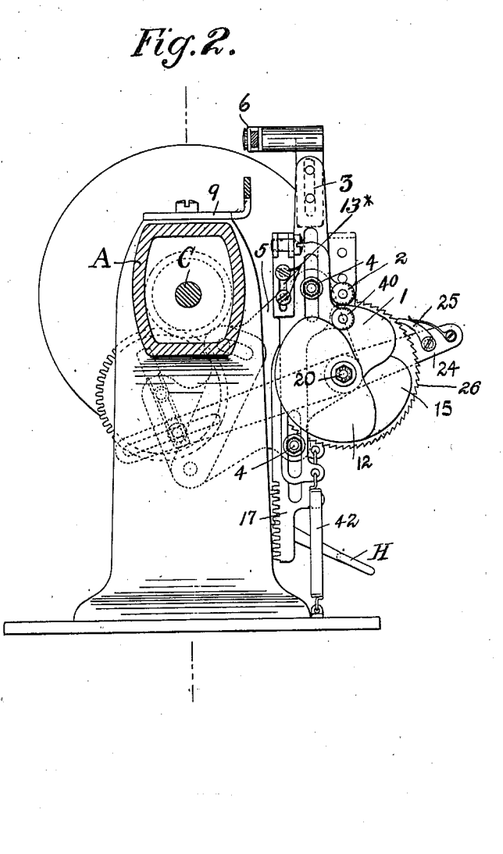
Fig. 2 is a vertical section on the line 2 2, Fig. 1.
Figure 3:
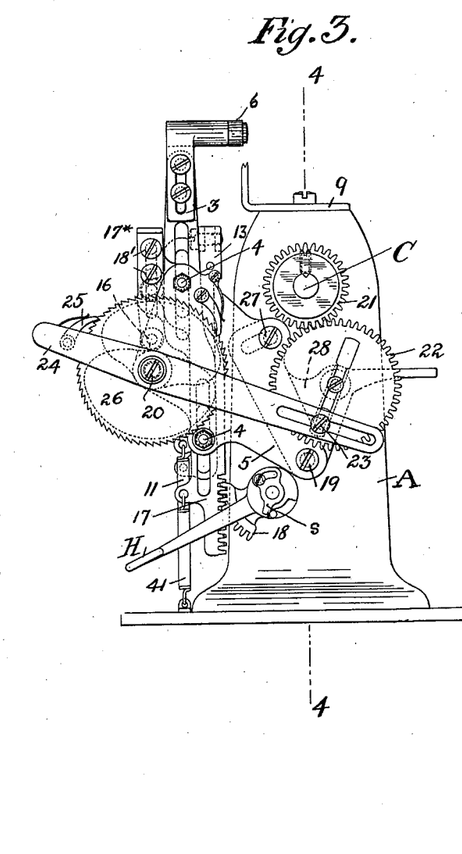
Fig. 3 is an end elevation with the hand-wheel removed.
Figure 4:
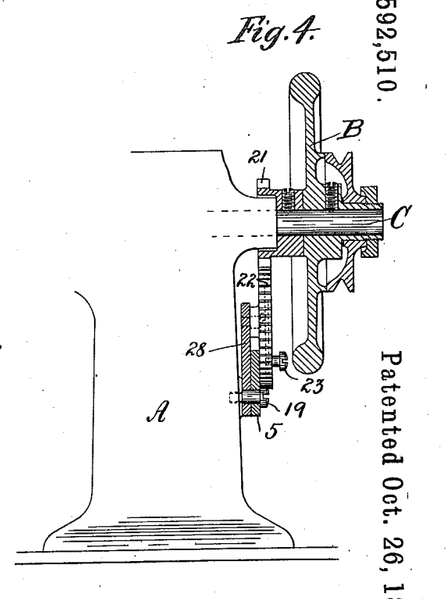
Fig. 4 is a longitudinal section on the line 4 4, Fig. 3, part of the machine-head being broken away and part of the mechanism being omitted.
Figures 5, 6, 7, 8, 9, 10, 11:
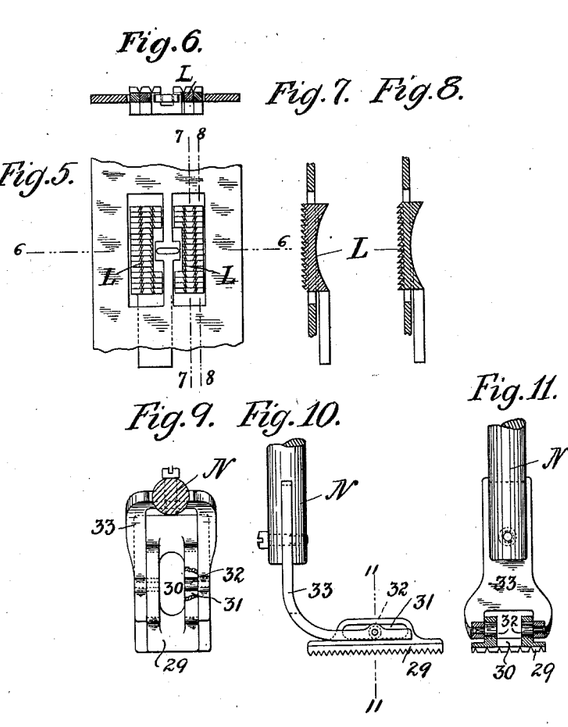
Figs. 5 to 8 are detail views of the feed-dog.
Figs. 9 to 11 are detail views of the presser-foot.
Figures 13, 14:
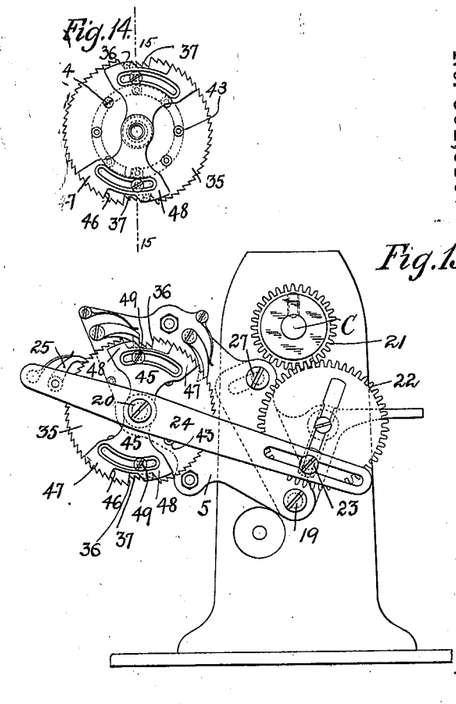
Fig. 13 is an end view of Fig. 12.
Fig. 14 is a face view illustrating the construction of the ratchet-wheels and sectors for operating the cam-shaft.
Figure 30:
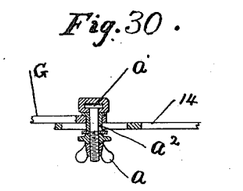
Figure 31:
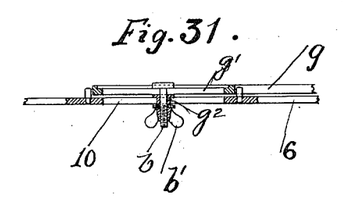
Figure 32:
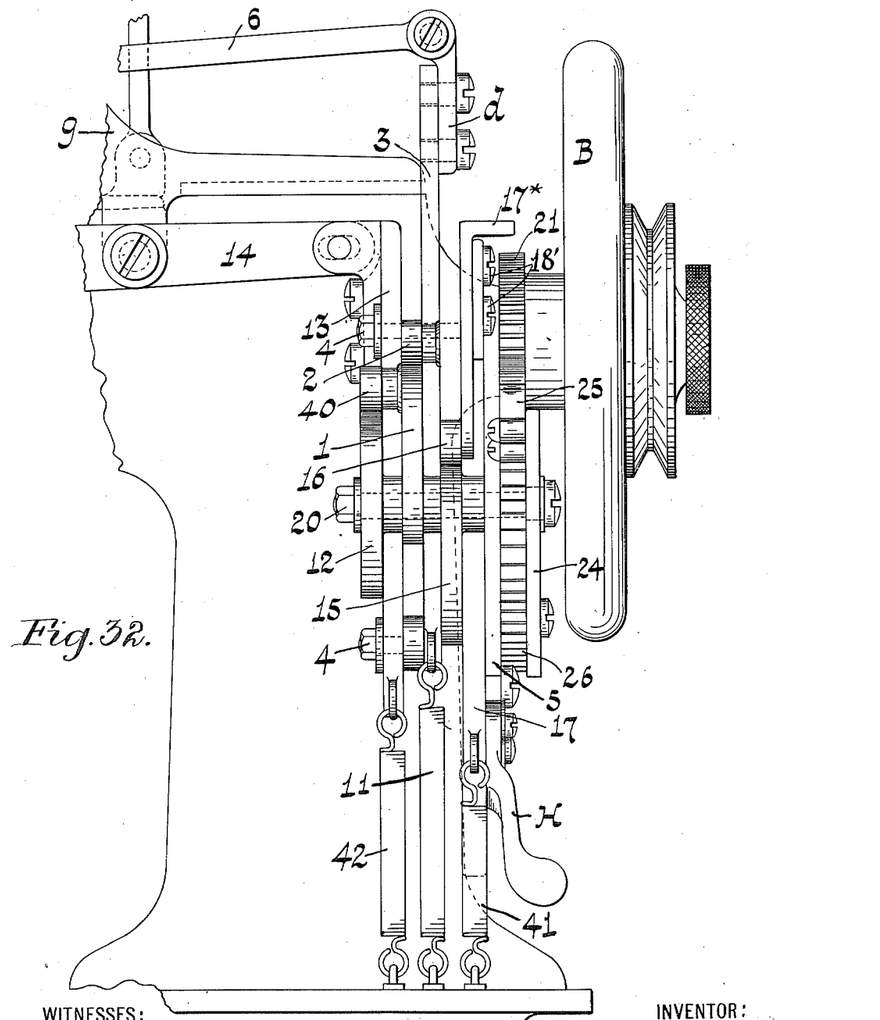
Fig. 32 is an enlarged elevation of the right-hand portion of the machine.

To effect automatically a change in the working position of vibration of the needle-bar, I substitute for the ordinary solid link connection between the needle-bar and the segment-lever a jointed connection G, used substantially as a toggle-joint, having one end attached to the needle-bar gate or frame and the other to the segment-lever E by a thumbscrew $a$, adjustably fitted to a seat $a'$, formed in said segment-lever, Figs. 1 and 30. If the segment-lever E is vibrated, the needle-bar is vibrated laterally through the medium of the connection G, but if the angle of the connection is changed by raising or lowering its toggle-joint the working position of vibration of the needle-bar is correspondingly changed, thereby moving the location of the stitch laterally, while the zigzag character thereof is retained. For automatically effecting the said lateral change in the working position of vibration of the needle-bar the following mechanism may be employed:

A pattern-cam 1, driven in the manner hereinafter explained, engages a roller-stud 2, mounted on a slide 3, guided to move vertically by slots formed therein, through which slots are passed studs 4, secured, respectively, to the top and bottom of a plate 5, attached to the machine-head A. The upper end of the slide 3 is connected by a lever 6 and link 7 with the toggle-joint 8 of the connection G. The fulcrum of the lever 6 is made in the form of a bolt $b$, passing through a slot $g'$ in a bracket $g$, secured to the head of the machine, and passing also through a slot 10 in said lever. On said bolt is a sleeve $g^2$, about which the lever can turn. A thumb-nut $b'$, threaded to the bolt, permits the same to be secured in any position in the slot, Figs. 1 and 31, whereby the fulcrum of the lever may be changed to alter the latter's action on the joint 8. If the fulcrum $b$ is moved to the left, the distance through which the needle-bar is bodily moved laterally by the action of the pattern-cam 1 is less, and vice versa. A spring 11, connected with the lower end of slide 3 and the bed of the machine, holds the roller-stud of the said slide 3 against the pattern-cam 1. It will be seen that the working position of the needle-bar will be laterally changed automatically under the influence of the pattern-cam 1 when said cam is actuated. The end of the toggle-joint-actuating lever 6 is secured to the slide 3 by a connection $d$, attached to the upper end of said slide by screws passing through a slot, as shown in Figs. 1, 2, and 3, so that the position of the end of said lever can be adjusted vertically with respect to said slide. The effect of this adjustment is to change the center past which the toggle-joint 8 moves, and consequently the center of the working position of vibration of the needle-bar. The lever 6 is provided with two laterally-projecting pins $6'$, engaging with the outer curved edges of the bracket 9, whereby said lever is prevented from being shifted in the direction of its length.

Figure 29:
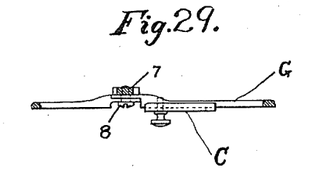
Figs. 29, 30, and 31 illustrate details of construction.

On the toggle-joint connection G, Figs. 1 and 29, is mounted a slotted sliding strap $c$, held to one member of said joint by a suitable screw passing through said slot. The adjacent ends of the members of the toggle connection are depressed to countersink the joint 8, so that the strap can be slid forward to engage with both members of the toggle-joint, thereby causing the toggle connection to act as a solid connecting-rod.

The mechanism so far described will enable the machine to sew automatically with a zigzag stitch in different angles or curves and with a constant lateral throw or vibration of the needle-bar. If the extent of the lateral throw or vibration of the needle-bar is to be changed, the segment-lever end of the toggle-joint connection G is shifted on the segment-lever E either by hand or automatically by a suitable mechanism. For the purpose of shifting automatically the aforesaid segment-lever end of the toggle-joint connection on said segment-lever I preferably employ a mechanism consisting of a pattern-cam 12, Figs. 1 and 2, which engages the roller-stud 40 of a slide 13, guided on the plate 5 by the slots and the studs 4, Fig. 2, and connected at its upper end to a lever 14. The free end of this lever is slotted or bifurcated and embraces a sleeve $a^2$ on the shank of the thumb-screw $a$, Fig. 30. A spring 42, connected with slide 13 and the bed of the machine, holds the roller-stud of said slide 13 against the pattern-cam 12. By choosing the proper shape for the pattern-cam 12 it is evident that the extent of the lateral throw of the needle-bar, and consequently the length of the stitch, can be automatically increased or decreased. The connection between the slide 13 and the lever 14 is made by means of a bracket, the horizontal member of which is connected to the lever 14 by a slot and stud, while the vertical member is connected to the slide 13 by a slot and screws 13*, as shown in Figs. 1 and 2, so that the position of the end of the lever can be adjusted vertically with respect to said slide.

Figures 15, 16, 17, 18, 19, 20, 24, 25, 26:
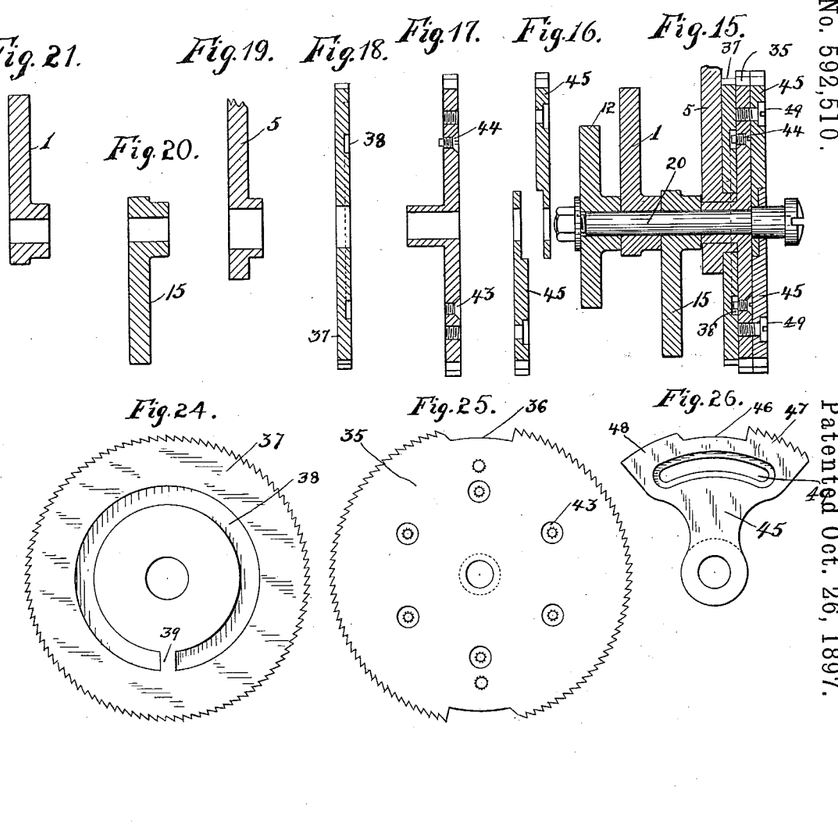
Figure 16:
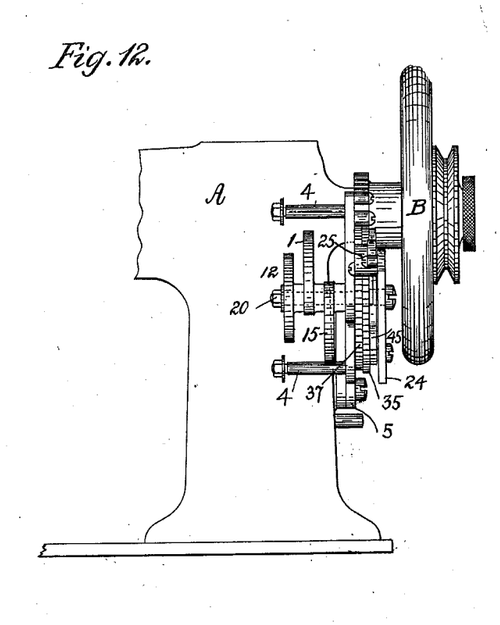
Figures 21, 23:
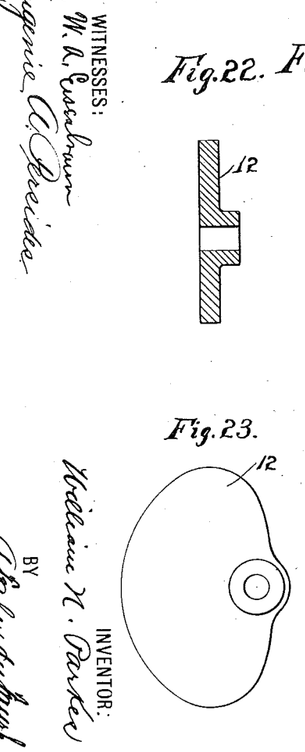
Figure 27:
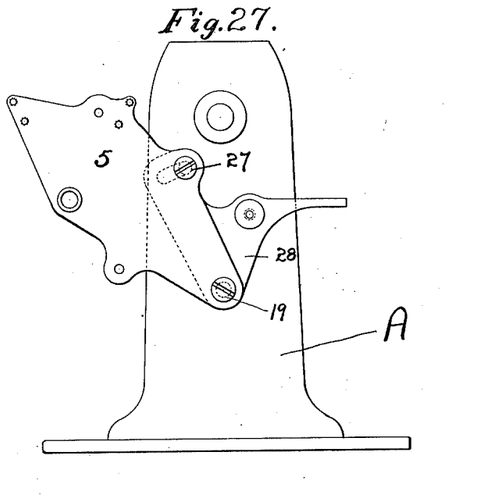
Fig. 27 is an end elevation of the machine with part of the mechanism omitted and illustrating the plates to which part of the mechanism is attached.
Figure 28:
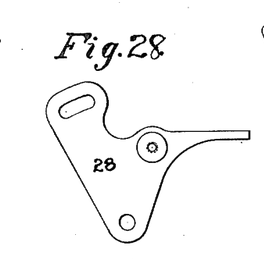
Fig. 28 is a face view of one of said plates.

The mechanisms above described control automatically the lateral movements of the needle-bar solely, and by means of the same a great variety of stitches can be automatically produced. To further increase the variety of stitches which may be produced automatically and also to adapt the machine for automatically stitching buttonholes or making tacks or bars, I have provided means for automatically increasing, decreasing, reversing, and stopping the feed action. To this end I operate directly upon the usual stitch or feed regulating lever H and preferably by the use of the following mechanism:

On the shaft 20, Figs. 1, 2, and 15, is mounted a pattern-cam 15, which engages with the roller-stud 16 of a slide 17, the lower end of which is made in the form of a rack-bar and placed in engagement with a toothed sector 18, attached to the hub of the stitch-regulating lever H. A spring 41, connected with aforesaid slide 17 and the bed of the machine, holds the roller-stud of said slide against the pattern-cam. The reciprocation of the said slide induced by the pattern-cam varies the length of the stitch, reverses the direction of the stitching whenever the stitch or feed regulating lever passes the center line of its motion or action, and entirely stops the action of the feed upon the work when the stitch-regulating lever is held at the center line of its motion or action. The roller-stud 16 is adjustably mounted on the slide 17 by means of a carriage 17*, carrying said roller-stud and adjustably mounted on said slide by a slot-and-screw connection 18'. The several pattern-cams used are preferably so secured as to be readily interchangeable, so that by substituting different pattern-cams a different motion or change of motion may be imparted either to the feed or to the lateral movements of the needle-bar, or to both.

To render the above clearer, it may be here stated that the stitch or feed regulating lever of the Wheeler & Wilson machine (to which machine my present invention is applied) is so adjustable as to make all of its actions either above or below the center of the stitch-regulating action or on both sides of said center line of action. When the lever is thrown below the center line of action, the feed carries the work from the operator, and when said lever is thrown above said line the feed is reversed and the work fed toward the operator. It will be noticed that the slide 17 is in operative connection with the feed-regulating lever H, and that by shifting the adjustable roller-stud 16 on said slide the center line of action of the lever H is shifted so as to cause the machine to feed the same amount backward and forward or more one way than the other. This action can be indefinitely varied. It will also be seen that by adjusting the usual stop s, Fig. 3, to limit the downward movement of the lever H, so as to prevent the roller-stud from entirely following the cam, the amount of action that the cam will have on the lever H will be varied. For example, the work can be fed backward and forward at different rates of speed automatically, or it may be fed faster by taking longer stitches in one direction than in the other, or the same length of stitches may be taken with a longer feed period in one direction than in the other, or the length of stitches may be automatically increased or decreased, as may be predetermined. By raising the roller-stud 16 the center line of action of lever H is lowered.

The several cams are in the present instance shown mounted on a common shaft 20, which can be rotated from the main shaft C of the machine by intermediate transmitting mechanism of any suitable construction. In the present instance I have shown a gear-wheel 21, secured to the main shaft and meshing into a larger gear-wheel 22, provided with an adjustable crank-pin 23, which engages with the slotted end of a pawl-lever 24. The pawl 25 of said lever engages a ratchet-wheel 26, rigidly mounted on the cam-shaft 20. By adjusting the position of the crank-pin the number of teeth which the feed-pawl 25 takes up at each stroke can be varied, and consequently the extent of the throw of the ratchet-wheel can be increased or decreased. The plate 5 is secured to the head of the machine by means of two studs 19 and 27, and in front of the same is mounted to turn about the stud 19 a plate 28, which latter carries the stud forming the journal for the gear-wheel 22. Plate 28 can swing about stud 19 and can be fixed by means of the stud 27. By throwing the plate outwardly gear 22 is disengaged from gear 21 and the machine runs as a simple zigzag machine. In view of the adjustability of the plate 28 a larger or smaller gear can be substituted for the purpose of obtaining a different rate of speed.

To obtain a steady and reliable feed in both directions, I slant part of the teeth of the feed-dog L in one direction and part in the reverse direction, as shown in Figs. 5, 6, 7, and 8, and for the purpose of carrying and guiding the work automatically in either direction I make use of a sliding presser-foot, which is also constructed to hold the work down all around the buttonhole. This construction for the presser-foot I have illustrated in Figs. 9, 10, and 11. As shown in these figures, the foot consists of a presser-shoe 29, provided with a central opening 30 and with suitable teeth on its lower side, the teeth preferably slanting in neither direction. The shoe is provided with slotted sides 31, engaged by small roller-studs 32, carried by the shank 33 of the presser-foot, which latter is secured in the slotted end of the presser-bar N, as usual. As the machine feeds the work along the presser-shoe is carried with the work in either direction by reason of the roughened or toothed surfaces of the presser-shoe 29 and holds the work firmly on the feed-points of the feed-dog.

For the purpose of enabling long ranges of stitches in either direction, quick or slow changes and reversals to be accomplished, and to provide for rests or stops in the motion of the pattern-cams I preferably use the driving mechanism for the pattern-cams illustrated in Figs. 12 to 26 in place of the one previously described. In this mechanism the driving ratchet-wheel 35 is operated by pawl-lever 24, as before, but it is provided with diametrically opposite gaps 36. Beside this ratchet-wheel is arranged a second smaller ratchet-wheel 37, loosely mounted on a bearing projecting from the plate 5, through which bearing the cam-shaft 20 passes. This ratchet-wheel 37 is provided on the side adjacent to the ratchet-wheel 35 with a circular groove 38, leaving a short transverse neck or projection 39. In the ratchet-wheel 35 is formed a series of openings 43, through which can be passed a screw 44, adapted to enter the circular groove 38 in the wheel 37. On the cam-shaft 20 are journaled two sectors 45, provided each with a notch 46, a toothed portion 47, and a projection 48. The teeth in the portions 47 are arranged coincident with those on the ratchet-wheel 35. The notches 46 are sufficiently deep to expose the teeth on ratchet-wheels 35 and 37, while the projections 48 cover the teeth of wheel 37 only. The sectors 45 can be set circularly by means of the pin-and-slot connections 49. Suitable holding-pawls are provided to prevent retrograde motion of the ratchet-wheels. The toothed portions 47 of the sectors can be set to bridge the gaps 36 in the wheel 35, or they may be set to partly bridge the same. The sectors 45 being circularly adjustable, they can be so placed that the notches 46 expose one or more teeth of the smaller ratchet-wheel 37, while the remaining portions of the notches are covered by the projections 48. The number of teeth exposed will determine the extent of movement of the smaller ratchet-wheel 37 and the period of rest of the pattern-cam, for the reason that when the feed-pawl reaches the notches it will at each stroke feed only the number of teeth exposed on said wheel 37. This rotation of the smaller ratchet-wheel 37 is independent of the number of teeth fed at each stroke on the larger wheel.

To illustrate, if both a long period of rest and quick motion of the pattern-cams are desired the number of teeth exposed on the smaller ratchet-wheel is made small and the stroke of the feed-pawl is made long, so as to take a large number of teeth on the larger ratchet-wheel. Assuming the case that the pawl-lever 24, the pawl 25 of which extends across both ratchet-wheels 35 and 37, is set to turn the fast ratchet-wheel 35 through three teeth at each stroke and that the sectors 45 are each set to expose two teeth on the loose ratchet-wheel 37, then the pawl 25 will feed the ratchet-wheel 35 through three teeth at each stroke until one of the notches 36 is reached, whereupon motion of the ratchet-wheel 35, and consequently that of the cam-shaft 20, stops, and the loose ratchet-wheel 37 is now turned through two teeth for each stroke of the pawl, but said wheel 37 being loose on a bearing projecting from the plate 5 its rotation has no effect on the pattern-cams. When the neck or projection 39 of ratchet-wheel 37 reaches the screw 44 in the ratchet-wheel 35, it carries said screw, and consequently the fast ratchet-wheel 35, with it until the teeth on said ratchet-wheel 35 are brought into a position to be again engaged by the feed-pawl 25. The wheel 35 is then driven by the feed-pawl to the same extent and at its former rate of speed and turns the pattern-cams as before. The loose ratchet-wheel 37 now remains stationary (the pawl 25 being lifted from the same, as the fast ratchet-wheel is larger in diameter than the loose ratchet-wheel) until the screw 44 in the fast ratchet-wheel 35 again engages with the projection 39 of the loose ratchet-wheel, or until one of the notches 36 is reached. When the second notch 36 in the ratchet-wheel 35 is brought opposite to the feed-pawl, said ratchet-wheel again ceases to turn and remains motionless until the projection 39 again engages the screw 44, as before described. Of course if but one notch 36 is uncovered the ratchet-wheel 35 will make one complete revolution before it comes to rest, and it is also to be understood that by placing the screw 44 into different holes or by using two such screws the time during which the pattern-cams are at rest can be varied. Furthermore, different periods of rest and different speeds of motion for the ratchet-wheel 35 and the cams controlled thereby can be obtained by exposing more or less teeth on the wheel 37 and by changing the stroke of the pawl-lever 24, and consequently the pattern-cams 1, 12, and 15 can be made to actuate the feed, change the stitch, and control the lateral position of the needle-bar at different times and for predetermined periods.

It will be readily understood that the driving mechanism just described differs from that illustrated in Figs. 1 to 4 in this respect: that it enables the feed-pawl to act upon a loose or idle ratchet-wheel for different periods of time, so that the cams remain at rest for different predetermined periods of time, whereby the variety of stitches that can be produced by the cams is greatly increased.

To explain the workings of the machine more fully, let it be assumed that the pattern-cam 1, which operates the toggle-joint-actuating lever 6, is heart-shaped or constructed to give a constant uniform reciprocating movement to the slide 3, and that the toggle-joint is connected at one end with the needle-bar, while its other end is fixed or stationary—that is to say, held from moving longitudinally. The toggle-joint can be set in this manner by shifting the end thereof on the segment-lever E until said end is brought in line with the pivot or shaft about which the segment-lever oscillates. If the cam-shaft 20 is rotated, a limited progressive lateral movement is imparted to the needle-bar due to the movements of the toggle-joint. If the feed is thrown out, the result will be a lateral line of ordinary stitching over the path that the needle travels, and as the cam continues to turn the needle will continue to stitch laterally to and fro over the same path, thereby piling the rows of stitching one upon the other and forming a kind of tack or bar. As the vertical reciprocations of the needle-bar are uniform with respect to the rotations of the driving-shaft of the machine, it will be understood that when I increase the throw of the cam I increase the throw of the toggle-joint-actuating lever 6 and the length of the lateral stitches with or without changing the length of the line or bar, and as I change the adjustable fulcrum $b$ of the toggle-joint-actuating lever 6 I increase or decrease the length of the bar or lateral line of stitching with or without changing the length of the stitches. By changing the throw of the cam the proper amount to correspond with the change of fulcrum the same length of stitch can be retained, or, in other words, if the length of the lateral line of stitching is to be increased the fulcrum of the toggle-joint-actuating lever 6 must be changed so as to increase the amount of action it will have on the toggle-joint, and if the length of the lateral stitches is to be retained the throw of the cam must be decreased, so as to offset the change of fulcrum and allow the needle to make more stitches. The machine under these conditions is suitable for certain kinds of tacking without the use of any feed action. As a practical illustration, let it be assumed that the needle makes six complete vertical reciprocations while the toggle-joint moves from its lowest to its central horizontal position, then the needle will move from right to left, making a line of six stitches, and as the toggle-joint returns from its central to its lowest position the needle moves from left to right, making a line of six stitches over the first line of stitches. The length of the stitches can be varied, as before described.

If now the feed mechanism is thrown into regular uniform action, it feeds the work along transversely to the lateral stitching of the needle, and the line of the path of stitching is changed so as to form automatically uniform angles or curves of stitching. If the length of stitch or the throw of the feed is increased or decreased, the length and curves of aforementioned angles of the stitch and the line of stitching will be changed, or if the throw of the cam 1 is increased the angles or curves of the line of stitching and the stitches will be changed, and also the number of angles or curves will be increased, and vice versa.

The feed-regulator H, as before described, controls the feed, so as to cause the work to be fed from the operator when moved below its central position and toward the operator when moved above its central position.

Assuming that the feed-regulator H is in its central position and the roller-stud 16 is adjusted toward the top of the slide 17, spring 41 is permitted to pull the said slide down, and as the feed-regulator H is in operative connection with said slide the said regulator will be moved below its central position, and if a sufficient change is made in the adjustment of the roller-stud all the feed will be in one direction—that is, from the operator—and the action of cam 15 will gradually increase and decrease the length of stitches for a predetermined number of stitches. The throw of the cam will determine the amount which the stitches will be increased and decreased or the number of the stitches made while a complete variation or action of the cam has taken place. To partly explain the use of the sectors 45, suppose, for example, that it is desired to sew a hundred stitches in one direction without any variation in the stitch and then have the feed shorten the length of the stitch, or reverse. To accomplish this, one of the gaps in the periphery of the driving ratchet-wheel is opened and the sector so adjusted as to take one hundred strokes of the actuating-pawl to turn the loose ratchet-wheel enough to bring the neck 39 of the same into contact with the projection 44 on the driving ratchet-wheel, whereupon the loose ratchet-wheel turns aforesaid ratchet-wheel into engagement with the actuating-pawl and thereby starts the cams turning. Cam 15 is so adjusted on the cam-shaft and the roller-stud so adjusted on the slide 17 that when the actuating-pawl is operating the loose ratchet-wheel the work will be moving from the operator at the desired length of stitch. Now when the actuating-pawl reaches the gap in the periphery of the larger ratchet-wheel the machine will feed the work for one hundred stitches from the operator—that is, while the actuating-pawl is driving the loose ratchet-wheel—and when said loose ratchet-wheel turns the driving ratchet-wheel into engagement with the actuating-pawl reversible or changing action will commence and continue until the change or variation in the stitches has been completed and another or the same gap in the periphery of the larger ratchet-wheel has been reached, whereupon cam action will be again suspended. If a certain number of stitches is to be made while the cam is turning in making the reverse or variation stitch—say, for example, twenty stitches—it can be accomplished by adjusting the crank-pin 23 on the side of the gear-wheel 22 so as to make the pawl-lever 24 turn the larger ratchet-wheel around while the machine is making twenty stitches, and if it is still desired to retain the one hundred straight-away stitches the segments on the driving ratchet-wheel are so adjusted as to allow the actuating-pawl to only take the same number of teeth as before on the loose ratchet-wheel. This is done by adjusting the sector so that the smooth part 48 on the same will cover the teeth on the loose ratchet-wheel, so as to only allow the actuating-pawl to take the same number of teeth as before on said loose ratchet-wheel, which will be done at the latter part of its stroke. As there are two circularly-adjustable projections 44 on the side of the driving ratchet-wheel, by having the neck 39 on the smaller ratchet-wheel work in between these two projections I can fully control the length of time that the actuating-pawl will feed on the loose ratchet-wheel, and I can further control this so as to feed the loose ratchet-wheel slow and the driving ratchet-wheel fast by using the smooth part on the periphery of the sectors.

If, for example, it is desired to feed the loose wheel one tooth at each stroke of the actuating-pawl until it has turned completely around and the driving ratchet-wheel five teeth at each stroke until it has made a complete turn, I adjust the crank-pin on the side of the gear-wheel so as to make the actuating-pawl take five teeth at a stroke and adjust circularly the adjustable projections 44, so that they are alongside of each other and operate substantially as one projection. I then open one of the gaps and adjust the corresponding sector so that the smooth part on the periphery of said sector will only expose one tooth of the loose ratchet-wheel. Thus from the above it will be seen that I have control of the cams, so that I can stop them for a predetermined number of stitches and actuate them at a predetermined rate of speed and for a predetermined number of stitches. The amount of action that cam 15 will have on the feed mechanism of the machine can also be regulated as follows: Say, for example, it is desired to stitch backward and forward and make a certain length of stitch in either direction. As the feed-regulating lever H is raised above the center of action the work will feed toward the operator and as it is turned below the center of action the work feeds from the operator. By adjusting the stop *s* on the lever II, I limit the downward movement of said lever and by raising the roller on slide 17 I limit the upward action of the cams on the slide and consequently the upward movement of the feed-regulating lever H.

The extent of the lateral throw of the needle can be increased or decreased by shifting the fulcrum *b* of the toggle-joint-actuating lever 6, as before described. The extent of the lateral throw of the needle can also be varied by the use of a properly-formed actuating-cam. If I now bring the end of the toggle-joint connection in a position to be influenced by the vibrations of the segment-lever, the needle-bar is vibrated or moved laterally through the toggle-joint connection from two distinct sources or cams, as I already have the needle-bar vibrated laterally through the toggle-joint-actuating lever and cam. Now loosen segment-lever end of the toggle-joint connection on the vibratory segment-lever, so that it will slide and connect the same with the actuating-lever 14, it being understood that the slide 13 is in connection with cam 12. As before stated, the end of the lever 14 can be adjusted vertically with respect to slide 13, and therefore by changing the position of the end of lever 14 with respect to the slide 13 the working position of the segment-lever end of the toggle-joint connection G is accordingly shifted with respect to the axis of vibration of the segment-lever.

From the above explanation it will be seen that by using the proper pattern-cams I can stitch backward and forward and then zigzag across this straight line of stitching, thereby forming a different kind of a bar or tack from the one before explained. It will also be seen that buttonholes can be made by overstitching one side and then automatically pushing the needle-bar laterally to and fro for the tacking or barring desired at the end of the buttonhole and then reversing the feed action, which will feed the work back for the other side of the hole, and then again automatically pushing the needle-bar laterally to and fro to complete or bar the other end of the buttonhole.

While I have herein described my invention as applied to a Wheeler & Wilson zigzag sewing-machine, it is evident that it can be equally well applied to other forms and may be applied to a number of stitch-forming mechanisms to simultaneously produce a number of stitches, buttonholes, or designs.

I wish it to be distinctly understood that I do not confine myself to the use of the particular mechanisms and devices herein shown and described for accomplishing the several objects in view, as it is evident that their mechanical equivalents may be substituted without departing from the spirit of my invention. Furthermore, it is very evident that the force for actuating the various devices and mechanisms may be derived from the lower shaft of the machine or from any other moving part of the same—such, for instance, as the vibrating segment E—instead of from the main shaft of the machine, as herein described. It is also to be understood that part of the mechanisms may be driven from one source of power and part from another source.

What I claim as new is—

1. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, substantially as described.

2. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, and means for automatically varying the extent of the throw of aforesaid lateral vibrations of the needle-bar, substantially as described.

3. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, and means adapted to automatically vary the number of said lateral movements of the working position of said needle-bar, substantially as described.

4. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, and means constructed to vary the extent of said lateral movements of the working position of the needle-bar, substantially as described.

5. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, and means constructed to automatically vary the extent and the number of said lateral movements of the working position of the needle-bar, substantially as described.

6. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, and means constructed to automatically vary the extent of aforesaid lateral vibrations and to automatically vary the extent and the number of aforementioned lateral movements of the working position of the needle-bar, substantially as described.

7. The combination with a sewing-machine having a needle-bar, means for vertically reciprocating the same, complemental stitch-forming mechanism, a cam, and operative means between the cam and the needle-bar for vibrating the latter laterally, of means constructed to automatically move laterally the working position of the lateral vibration of said needle-bar, substantially as described.

8. The combination with a sewing-machine having a needle-bar, means for vertically reciprocating the same, a complemental stitch-forming mechanism, a cam, and operative means between the cam and the needle-bar for vibrating the latter laterally, of an actuating pattern-cam, and operative means between said pattern-cam and the needle-bar constructed to automatically move laterally the working position of the lateral vibration of said needle-bar, substantially as described.

9. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, a feed mechanism, and means for automatically increasing or decreasing the extent of the throw of the feed, substantially as described.

10. The combination with a sewing-machine having a needle-bar, mechanism constructed to vertically reciprocate and laterally vibrate the said needle-bar, and complemental stitch-forming mechanism, of means constructed to automatically move laterally the working position of the lateral vibration of said needle-bar, a reversible feed mechanism, and means for reversing the feed mechanism and for changing the extent of movement of the feed mechanism on reversal, substantially as described.

11. The combination with a sewing-machine having a needle-bar, mechanism constructed to vertically reciprocate and laterally vibrate the said needle-bar, and a complemental stitch-forming mechanism, of means constructed to automatically move laterally the working position of the lateral vibration of said needle-bar, a reversible feed mechanism, and means for automatically increasing, de-creasing and reversing for a predetermined number of stitches in one direction and a predetermined number of stitches in the opposite direction aforesaid feed mechanism, substantially as described.

12. In a sewing-machine, the combination of a vertically-reciprocating and laterally-movable needle-bar, a vibratory segment-lever, a toggle-joint connection between said vibratory segment-lever and aforesaid needle-bar, a second lever adjustable on its fulcrum and placed in operative connection with aforementioned toggle-joint, and means for actuating said second lever, substantially as described.

13. In a sewing-machine, the combination of a vertically-reciprocating and laterally-movable needle-bar, a vibratory segment-lever, a toggle-joint connection between said vibratory segment-lever and aforesaid needle-bar, a second lever adjustable on its fulcrum and placed in operative connection with aforementioned toggle-joint, a pattern-cam in operative connection with said second lever, and means for actuating said pattern-cam, substantially as described.

14. In a sewing-machine, the combination of a vertically-reciprocating and laterally-movable needle-bar, a vibratory segment-lever, a toggle-joint connection between said vibratory segment-lever and aforesaid movable needle-bar, a second lever adjustable on its fulcrum and placed in operative connection with aforementioned toggle-joint, a pattern-cam in operative connection with said second lever, a ratchet-wheel in operative connection with said pattern-cam, an adjustable pawl-lever for operating said ratchet-wheel, and an operative connection between the driving-shaft of the machine and said adjustable pawl-lever, substantially as described.

15. In a sewing-machine, the combination of a vertically-reciprocating and laterally-movable needle-bar, a vibratory segment-lever, a toggle-joint connection between said needle-bar and aforesaid vibratory segment-lever, a gear-wheel driven by the main shaft of the machine, an adjustable crank-pin on the side of said gear-wheel, a lever in operative connection with said adjustable crank-pin, a pawl on said lever, a ratchet-wheel engaged by said pawl, a cam circularly adjustable on the ratchet-wheel shaft, and an operative adjustable connection between said cam and aforesaid toggle-joint, substantially as described.

16. In a sewing-machine, the combination of a vertically-reciprocating and laterally-movable needle-bar, a vibratory segment-lever, a toggle-joint connection between said vibratory segment-lever and aforesaid needle-bar, a ratchet-wheel mounted to turn loosely on a bearing, a second ratchet-wheel placed at the side of the first ratchet-wheel and fastened on a shaft running through the bearing on which the first ratchet-wheel is mounted, an adjustable pawl-lever in operative connection with the driving-shaft of the machine, a pawl on said lever, means constructed to cause said pawl to engage the ratchet-wheels intermittently and alternately for a predetermined number of strokes, a pattern-cam mounted on same shaft with the second ratchet-wheel, and an adjustable operative connection between said cam and the toggle-joint, substantially as described.

17. In a sewing-machine, the combination of a vertically-reciprocating and laterally-movable needle-bar, a vibratory segment-lever, a toggle-joint connection between said vibratory segment-lever and the needle-bar, two ratchet-wheels of different diameters, the smaller one being loosely mounted and the larger one being adjacent to the smaller and fastened on a shaft, means whereby said ratchet-wheels are caused to intermittently engage with each other, an actuating-pawl for engaging said ratchet-wheels, a pattern-cam mounted on the same shaft with the larger ratchet-wheel, one or more gaps in the periphery of aforesaid larger ratchet-wheel constructed to permit aforesaid actuating-pawl to engage intermittently and alternately with said ratchet-wheels, an adjustable lever connection between the toggle-joint and the pattern-cam, and adjustable means for closing the aforesaid gaps in the periphery of the larger ratchet-wheel so as to cause a continuous feed of said ratchet-wheel by the actuating-pawl, substantially as described.

In testimony that I claim the foregoing as my invention I have signed my name, in presence of two witnesses, this 18th day of February, 1896.

WILLIAM N. PARKES.

Witnesses:
A. FABER DU FAUR, Jr.,
G. W. EISENBRAUN.